United States Patent [19]
Kimura

[11] Patent Number: 5,072,260
[45] Date of Patent: Dec. 10, 1991

[54] IMAGE FORMING APPARATUS HAVING ANALOG AND DIGITAL EXPOSURE MEANS

[75] Inventor: Akiyoshi Kimura, Tokyo, Japan

[73] Assignee: Canon Kabushiki Kaisha, Tokyo, Japan

[21] Appl. No.: 634,824

[22] Filed: Jan. 2, 1991

Related U.S. Application Data

[63] Continuation of Ser. No. 197,164, May 23, 1988, abandoned.

[30] Foreign Application Priority Data

May 26, 1987 [JP] Japan .................................. 62-127186

[51] Int. Cl.$^5$ ............................................. G03G 21/00
[52] U.S. Cl. ..................................... 355/218; 355/228
[58] Field of Search ................. 355/202, 218, 219, 220, 355/228; 346/160

[56] References Cited

U.S. PATENT DOCUMENTS

| | | | |
|---|---|---|---|
| 3,778,148 | 12/1973 | Fujitsuka et al. | 355/218 |
| 4,046,471 | 9/1977 | Branham et al. | 355/218 X |
| 4,047,811 | 9/1977 | Allis et al. | 355/218 |
| 4,354,757 | 10/1982 | Ritzerfeld | 355/218 |
| 4,477,179 | 10/1984 | Inuzuka et al. | 355/228 X |
| 4,538,905 | 9/1985 | Griego et al. | 355/218 X |
| 4,655,579 | 4/1987 | Adachi et al. | 355/218 |
| 4,728,985 | 3/1988 | Nakashima et al. | 355/218 X |

*Primary Examiner*—Fred L. Braun
*Attorney, Agent, or Firm*—Fitzpatrick, Cella, Harper & Scinto

[57] ABSTRACT

An image forming apparatus includes a movable photosensitive member, a charger for uniformly charging the photosensitive member, exposure device for illuminating an original and exposing the photosensitive member charged by the charger to the light from the original, a scanner for scanning by a laser beam the photosensitive member charged by the charger, the scanner including a deflector for deflecting the laser beam, and wherein the deflector is disposed upstream of an exposure position of the exposure device with respect to movement direction of the photosensitive member, and a scanning position of the scanner is disposed downstream of the exposure position. The laser beam forms a margin on the photosensitive member for the leading edge of a copy sheet.

13 Claims, 6 Drawing Sheets

IMAGE FORMING APPARATUS HAVING ANALOG AND DIGITAL EXPOSURE MEANS

This application is a continuation of application Ser. No. 07,197,164 filed May 23, 1988, now abandoned.

FIELD OF THE INVENTION AND RELATED ART

The present invention relates to an image forming apparatus comprising optical systems using analog light provided by illuminating an original and digital light (laser beam or the like) emitted in accordance with an electric signal.

With increasing multi-functions of an image forming apparatus, an apparatus is considered wherein in addition to an image exposure of a photosensitive member to reflected light or transmitted light provided by illuminating an original, another image scanning function for scanning the photosensitive member with a laser beam modulated in accordance with an electric signal, is incorporated, as disclosed in U.S. Pat. Nos. 4,379,631 and 4,469,767.

In a laser beam printer using a laser beam for effecting printing, an optical path length for the laser beam is required to be long enough, in order to provide a wider scanning range by a polygonal rotating mirror.

In U.S. Pat. Nos. 4,563,694 and 4,630,070, a laser beam is deflected by a fixed mirror and then is incident on a photosensitive member, by which a sufficiently long optical path is provided without substantial increase of the size of the apparatus.

SUMMARY OF THE INVENTION

It is a principal object of the present invention to provide an image forming apparatus comprising an optical system for exposing a photosensitive member to light from an original and an optical system for scanning the photosensitive member with a laser beam modulated in accordance with an electric signal, wherein the scanning optical system includes a deflecting means for deflecting the laser beam.

It is another object of the present invention to provide an image forming apparatus wherein the laser beam is able to function reliably for a long period of time.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
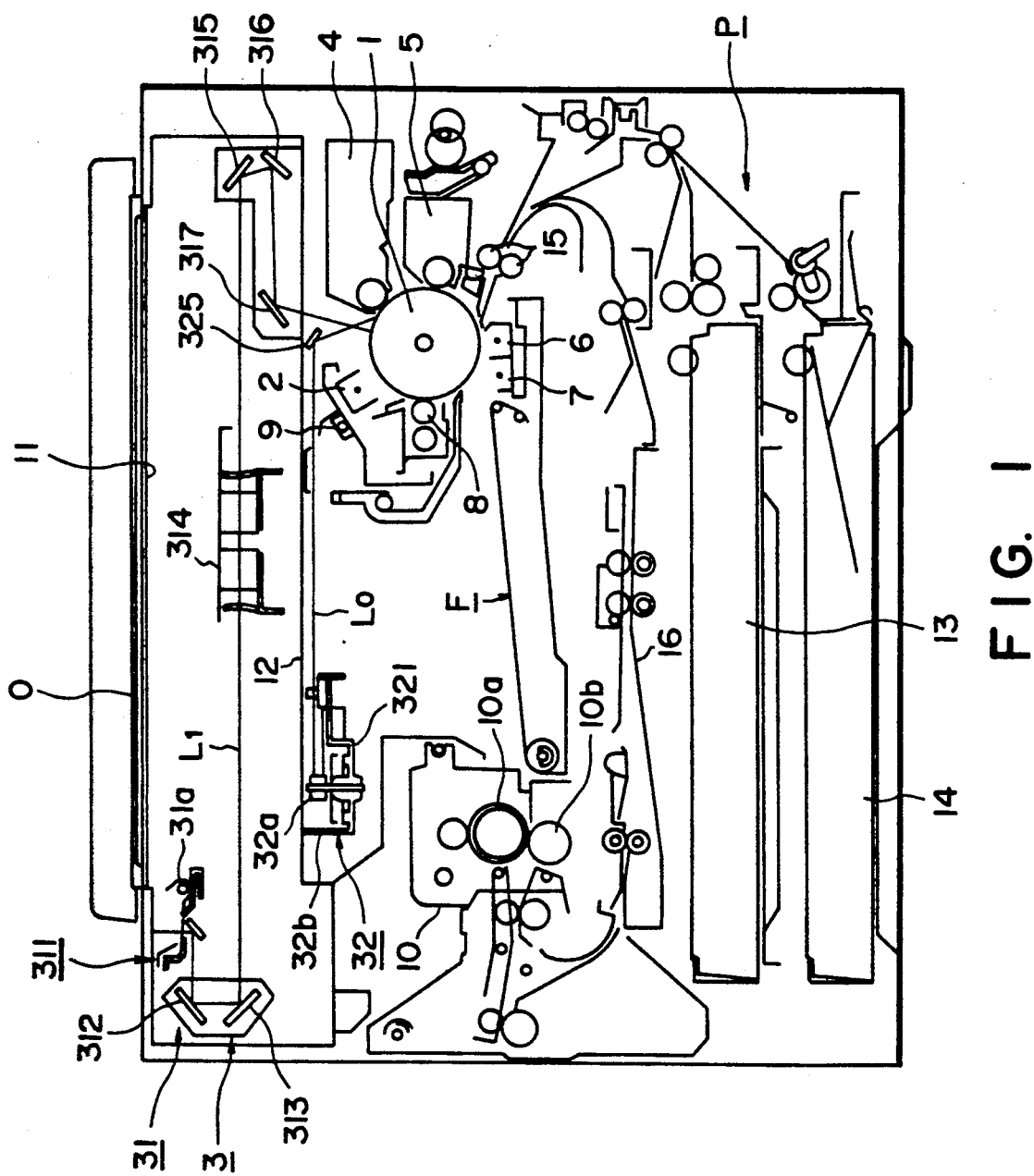
FIG. 1 is a sectional view of an image forming apparatus according to an embodiment of the present invention.
Figure 2:
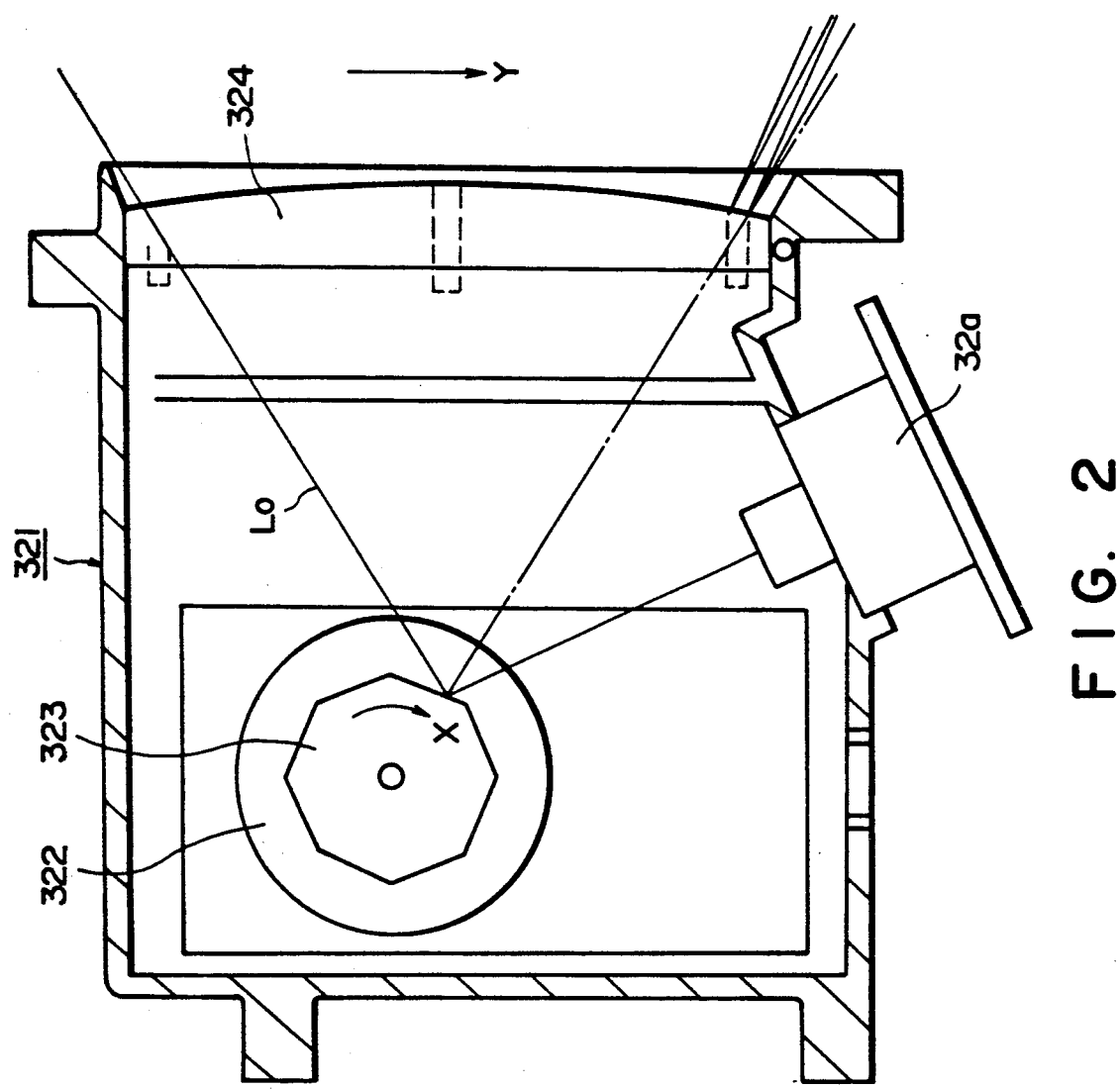
FIG. 2 is a top plan view of a laser scanner unit used in the apparatus of FIG. 1.

Referring to FIG. 1, there is shown an image forming apparatus according to an embodiment of the present invention. FIG. 2 is an enlarged view of an optical system 32 in FIG. 1.

The image forming apparatus comprises a photosensitive drum 1 functioning as an image bearing member rotatable in a direction indicated by an arrow. Around the photosensitive drum 1, there are provided a charger 2, exposure means 3, first and second developing devices 4 and 5, transfer and separation chargers 6 and 7, a cleaner 8 and an eraser lamp 9 in the order named, and an image forming operation is performed through a known electrophotographic process. More particularly, the photosensitive drum 1 is electrically charged by the charger 2 and is exposed to a light image through the exposure means 3 so that an electrostatic latent image is formed. The latent image is visualized by the first or second developing device 4 or 5 into a toner image. The visualized image is transferred by the transfer charger 6 onto a transfer sheet fed from a sheet feeding system P. The transfer sheet is separated from the photosensitive drum 1 by the separation charger 7 after the image is transferred thereonto, and is conveyed through a conveying system F to an image fixing device 10, where the toner image is fixed by passing the transfer sheet through a nip formed between rollers 10a and 10b.

The exposure means 3 includes an analog optical system 31 by which an original O placed on an original platen 11 is scanned, and the image thereof is projected onto the photosensitive drum 1 through a slit, and it also includes a digital optical system 32 by which the photosensitive drum 1 is exposed, in addition to the exposed image of the original O, to a laser beam L0 which is emitted from a light source, more particularly, a laser unit 32a in this embodiment including a semiconductor laser. The laser beam L0 is modulated in accordance with an electric signal representative of an image to be formed.

The analog optical system 31 includes an optical scanning system 311 provided with an illumination lamp 31a, movable mirrors 312 and 313 movable in association with the optical scanning system 311, a lens 314 for forming an image of the original O on the photosensitive drum 1, and fixed mirrors 315, 316 and 317 for directing to the photosensitive drum 1 the image light L1 after passing through the lens 314.

On the other hand, the digital optical system 32 is disposed above the sheet conveying system F at the backside of a base 12 of the analog optical system 31. Since an optical system casing 32b of the digital optical system is fixed to the base of the analog optical system, the optical accuracy of the laser beam relative to the analog light can be increased.

The laser scanner unit 321 provided with the laser unit 32a includes a rotatable mirror, more particularly, a polygonal mirror 323 in this embodiment, which is directly connected to a laser motor 322 as shown in FIG. 2, so that it is rotatable in the direction indicated by an arrow X. The laser beam L0 emitted and collimated by the laser unit 32a is deflected by each of the reflecting surfaces of the polygonal mirror 323, and is deflected in a direction indicated by an arrow Y by each of the reflecting surfaces of the polygonal mirror 323, and the laser beam L0 is imaged by the lens 324 on the photosensitive drum 1, so that the photosensitive drum 1 is exposed to the imaged laser beam. The laser beam L0 is reflected to the photosensitive drum 1 by a deflecting mirror 325 which extends parallel to the base 12 and is fixed to the frame of the apparatus below the base 12 and adjacent to the photosensitive drum 1. The deflecting mirror 325 is effective to deflect the optical path for the laser beam, and therefore, to deflect the laser beam. By the deflection by the mirror 325, the optical path length for the laser beam can be increased, whereby the effective distance between the laser unit 32a and the photosensitive drum 1 can be decreased, together with the advantage of a larger latitude for the various parts in the apparatus.

In place of the deflecting mirror, a prism or the like may be used, to deflect the optical path for the laser beam.

The sheet feeding system P for feeding a transfer sheet to a transfer station adjacent the photosensitive drum 1 includes cassettes 13 and 14 arranged in two stages, from which the transfer sheet can be fed out selectively. The transfer sheet fed out of one of the cassettes 13 and 14 is once stopped by and then fed to the transfer station by a registration roller 15 disposed adjacent the photosensitive drum 1. The sheet feeding system further includes an intermediate tray 16 for temporarily storing the transfer sheet or sheets having received an image, in a superimposing transfer mode.

The laser beam L0 is used for erasing unnecessary part or parts of the electrostatic latent image formed on the image bearing member 1 through the analog optical system 31, and/or for superimposedly projecting an image or data which is not contained in the original and which is introduced from a computer, a word processor or another operating system.

In the case where a deflecting mirror for increasing the optical path length for the digital optical system is used in an apparatus containing both of the digital optical system and the analog optical system, it has been found that there are problems.

Figure 5:
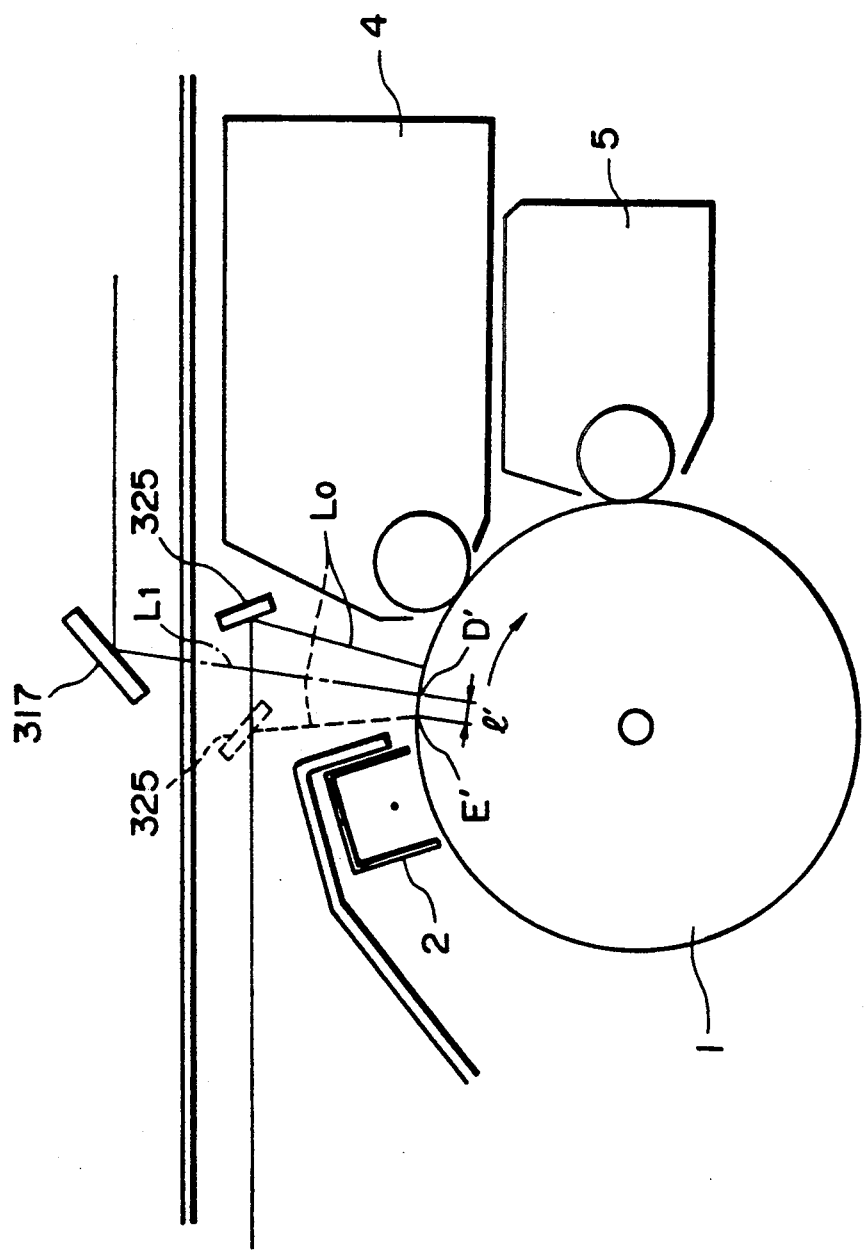
FIG. 5 is a sectional view of an apparatus for explaining the present invention.

Referring to FIG. 5, the problems will be described. Where the fixed deflecting mirror 325 for deflecting the laser beam in the digital optical system is disposed adjacent to the developing device 4, the deflecting mirror 325 is contaminated by the developer or toner scattered from the developing device 4 when the developing device is in operation. If the deflecting mirror 325 is contaminated, the reflectivity of the mirror 325 decreases so that the laser beam L0 becomes unable to scan or write in the intended manner. Particularly, since a laser beam L0 is used as a light beam, the diameter of the spot formed by the laser beam L0 is as small as approximately 83 microns (12 pel resolution), 125 microns (8 pel resolution) and 250 microns (4 pel resolution), and therefore, a small and partial contamination of the mirror influences the image formation significantly.

On the other hand, where the deflection mirror 325 is disposed across the position D' where the image light from the original is incident through the analog optical system, from the developing devices 4 and 5, the deflection mirror 325 is away from the developing devices 4 and 5, and therefore, the reflecting surface can be prevented from contamination. However, the position where the laser beam L0 is incident on the image bearing member at the leading edge of the image becomes unstable, as will be explained in the following.

Figure 6:
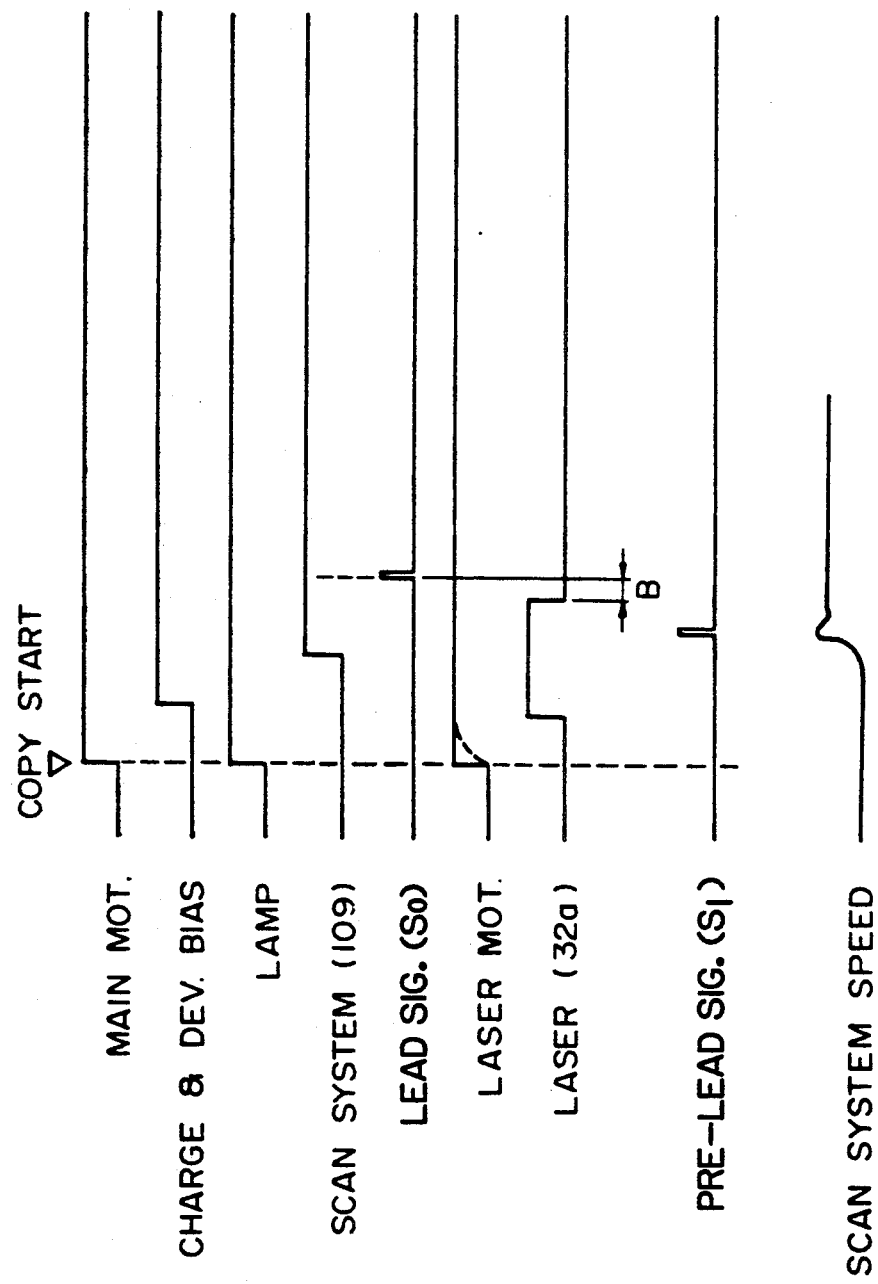
FIG. 6 is a timing chart illustrating control timing of the apparatus of FIG. 5.

Referring to FIG. 6, there is shown a timing chart in a copy sequence when the deflection mirror 325 is disposed away from the developing devices 4 and 5. Usually, about 2 mm blank is provided at a leading edge of a copy image to be transferred onto a transfer sheet in order to prevent the transfer sheet from wrapping around the image fixing roller. In this embodiment, the electric charge is dissipated by the laser beam L0 from the leading edge portion of the latent image formed on the image bearing member 1 so as to provide the blank.

If the beam incident position E' of the laser beam L0 is upstream by a distance l' from the analog light L1 incident position, the laser beam has to be stopped prior to an image leading edge signal S0 by the time period $B = (l' + 2 \text{ mm})/v$ (sec). Therefore, it is not possible to control the stop timing of the laser, for providing the blank, on the basis of the image leading edge signal S0. This necessitates production of a pre-leading edge signal S1 prior to production of the leading edge signal S0 to control the laser stop timing.

If, however, the pre-leading edge signal S1 is produced on the basis of the scanning position of the optical scanning system 311, the length of the leading edge blank varies since the speed of the optical scanning system 311 is not yet stabilized in the pre-leading edge position. In order to make constant the speed of the optical scanning system 311 by the time of the pre-leading edge signal S1 production, the pre-run distance of the optical scanning system 311 has to be made longer, or the torque of the driving motor has to be increased. This decreases the copying speed and increases the size of the apparatus and the cost.

Figure 3:
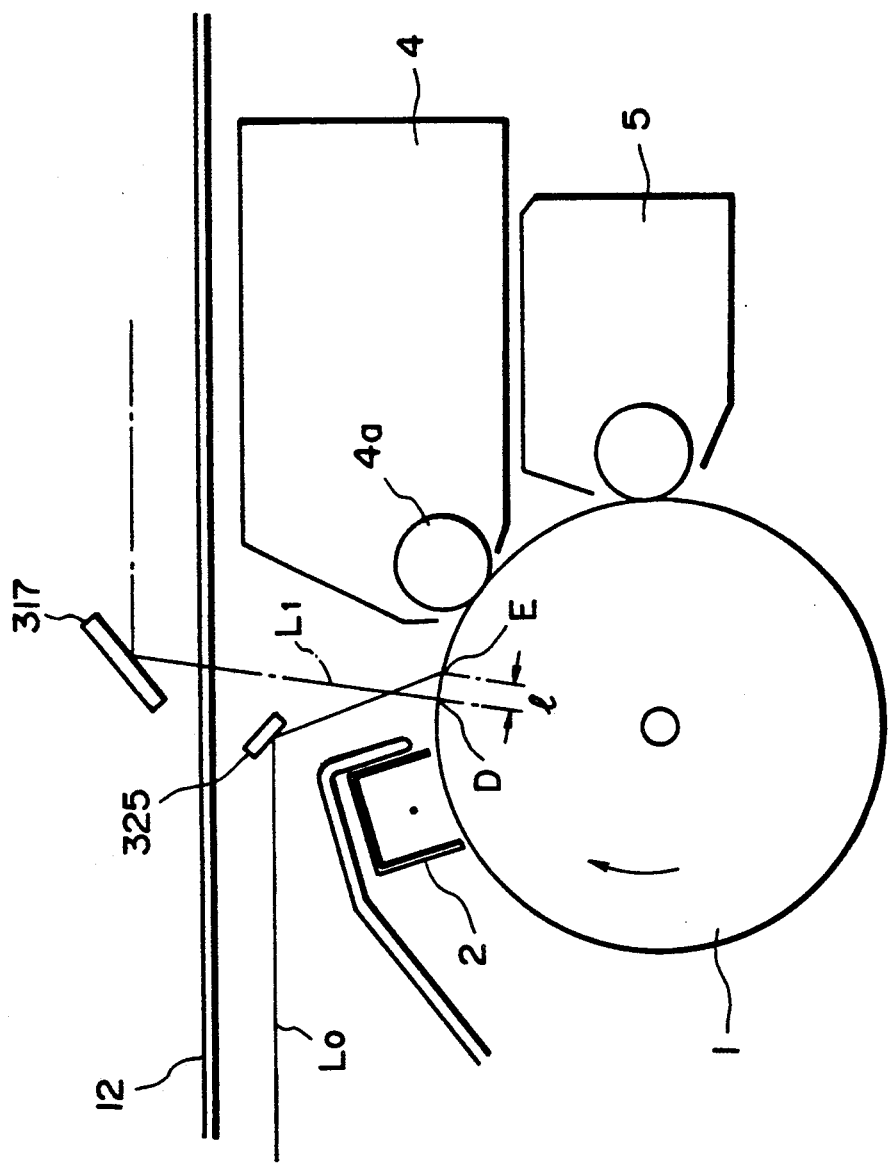
FIG. 3 is a partial elongation of the apparatus of FIG. 1.

Referring to FIG. 3 which is an enlarged view of a part of FIG. 1 embodiment, the present invention provides a solution to those problems, as will be described in the following.

The incident position E of the laser beam L0 which is reflected by the deflection mirror 325 and is incident on the photosensitive drum 1 is disposed away from the incident position D of the original image light L1 through the analog optical system 31 by a distance l toward the first developing device 4 disposed downstream with respect to rotation of the photosensitive drum 1. The angle of incidence of the laser beam L0 is larger than that of the analog image light, and the optical paths for them are crossed as will be understood from FIG. 3. Similarly to the conventional apparatus, the present invention is such that the electric charge at the leading edge portion of the exposed image of the original is dissipated by the laser beam L0 to provide the 2 mm blank, so that the angle of the deflection mirror 325 is determined so that $l \geqq 2$ mm.

Figure 4:
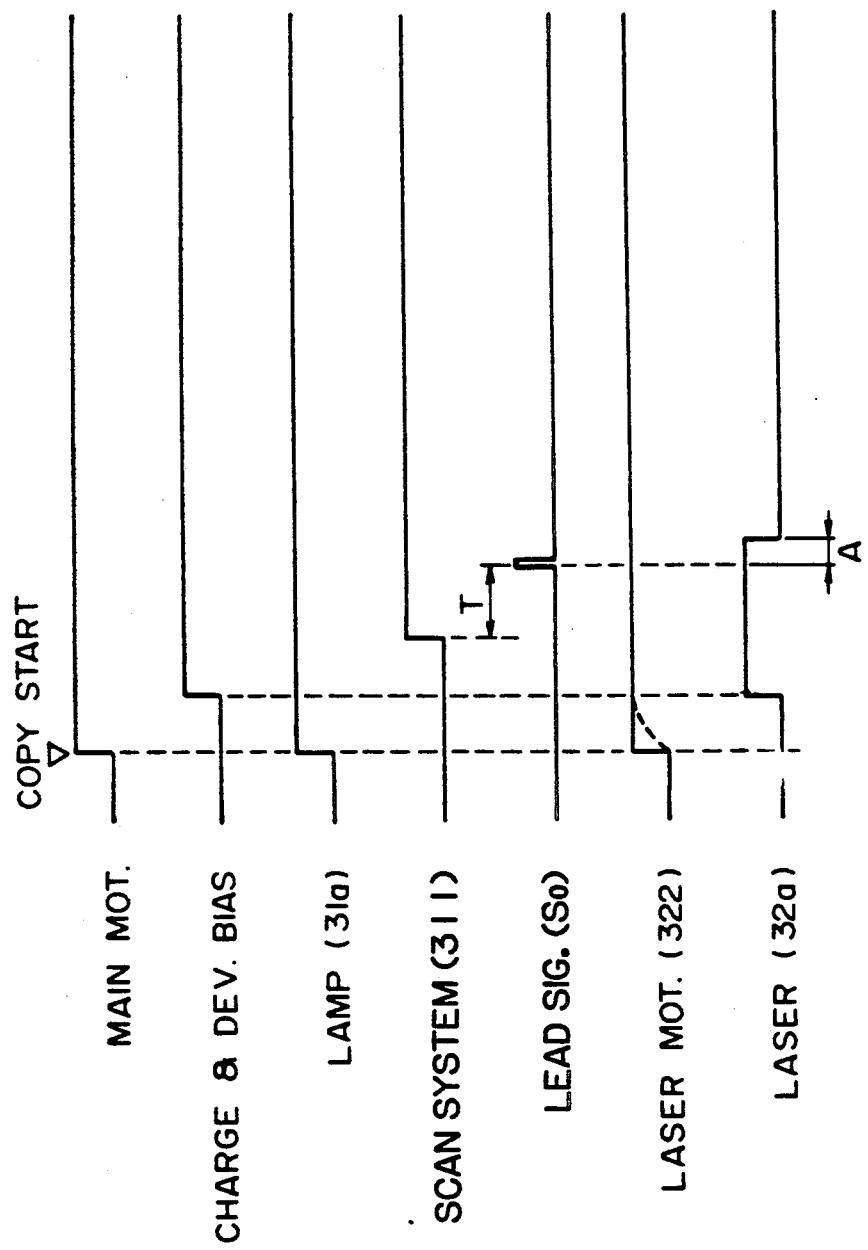
FIG. 4 is a timing chart illustrating the control timing in the apparatus of FIG. 1.

Referring to FIG. 4, the operation of the apparatus of FIG. 3 will be described. With the copy start, the main motor M and the illumination lamp 31a of the optical scanning system 311 are energized. Then, the charger 2 and the developing bias for the first and/or the second developing device 4, 5 are turned on. Subsequently, the optical scanning system 311 starts, and after it pre-runs for a predetermined period of time T, an image leading edge sensor (not shown) is actuated at a position corresponding to the leading edge of the original 0, so that an image leading edge signal S0 is produced. By this time, the driving motor 322 of the laser scanner unit has been rotated, and the laser 32a has been actuated, so that the laser beam L0 has been emitted. In this manner, since the laser beam L0 has been emitted prior to the production of the image leading edge signal S0, the electric charge on the photosensitive drum 1 in the region corresponding to the portion prior to the transfer sheet can be removed by which the toner is prevented from being deposited onto the photosensitive drum 1 wastefully in the region.

After the time period A elapses after production of the image leading edge signal S0, the laser beam by the laser 32a is stopped. The time period A is (1–2 mm)/v (sec), where 1 is a distance measured along the periphery of the photosensitive drum 1 between the analog original image light L1 incident position D and the laser beam L0 incident position E; v (mm/sec) is a peripheral speed of the photosensitive drum; and the required blank is 2 mm. The timing is controlled by a microprocessor on the basis of the time period A (sec). Since the laser stop timing of the laser 32a is controlled on the basis of the image leading edge signal S0 produced by the optical scanning system 311 which has been stabilized after completion of the pre-running operation, the blank of 2 mm can be correctly produced at the leading edge portion of the exposed image of the original.

Additionally, the deflection mirror 325 of the digital optical system 32 is disposed upstream of the original image light L1 and away from the first developing device 4 with respect to the peripheral movement of the photosensitive drum 1, by which the amount of the toner scattered out of the developing sleeve 4a of the first developing device 4 and reaching the deflection mirror 325 can be significantly reduced. Thus, the contamination of the deflection mirror 325 by the toner can be minimized. Thus, production of an unnecessary image in the blank by the laser beam L0 can be avoided. This is not limited to the production of the blank at the leading edge portion, but applies to the case of image erasure in a designated region or regions in the image of the original, erasure of a black frame upon reduction copy, and digital image formation from an external data or operating station.

In the foregoing embodiment, the description has been made with respect to a copying apparatus which is a stationary original supporting platen type, but is applicable to a copying apparatus or the like of a movable platen type.

As described in the foregoing, according to the present invention, since the light beam deflection means of a digital optical system is disposed across the original image light incident optical path from the developing means, the deflection means can be prevented from contamination by the scattering of the developer upon developing operation, so that the image quality can be maintained high for a long period of time. In addition, since the light beam is incident at a position at the developing device side, that is, downstream of the original light image incident position with respect to movement of the image bearing member, the timing control is possible without use of an unstable pre-leading signal, and therefore, the timing control can be performed stably on the basis of the stabilized leading edge signal, and therefore, the exposure position of the light beam at the leading edge portion of the formed image can be stabilized. When, for example, a blank is formed at the leading edge portion, it is formed in a stabilized manner. Further, the necessity of a sensor for production of the pre-leading edge signal is eliminated to reduce the cost, and the size of the apparatus can be minimized.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus, comprising:
   a movable photosensitive member;
   slit exposure means, operable based on a copy start signal, for exposing said photosensitive member at an exposure position to light from an original through a slit by relative movement between said photosensitive member and said slit exposure means;
   scanning means for scanning said photosensitive member at a scanning position by a laser beam; and
   signal generating means for generating a leading edge signal on the basis of the relative position between the leading edge of an original and said slit exposure means, wherein the laser beam is controlled based on the leading edge signal;
   wherein the scanning position is downstream of the exposure position with respect to a movement direction of said photosensitive member.

2. An apparatus according to claim 1, further comprising transfer means for transferring a developed image onto a transfer material from said photosensitive member, and wherein said scanning means scans by the 3. An apparatus according to claim 1, wherein an angle of incidence of the laser beam onto said photosensitive member is larger than that of light from said exposure means.

4. An apparatus according to claim 1, wherein each of said exposure means and scanning means includes a plurality of mirrors, and wherein a light incidence direction from said exposure means by the mirror thereof closest to said photosensitive member is crossed with that of the scanning means.

5. An apparatus according to claim 1, wherein said exposure means projects light reflected by the original.

6. An apparatus according to claim 1, wherein said scanning means functions to dissipate by the laser beam electric charge of a latent image formed by said slit exposure means.

7. An apparatus according to claim 6, wherein a distance between the exposure position and the scanning position by said scanning means is not less than a width in which the electric charge is dissipated.

8. An apparatus according to claim 6, wherein the laser beam is scanned onto a leading edge portion of a latent image exposed by said slit exposure means, and oscillation thereof is stopped when the leading edge signal is generated.

9. An apparatus according to claim 1, wherein said scanning means includes means for deflecting the laser beam to the scanning position, and wherein said deflecting means is disposed upstream of the exposure position of said exposure means with respect to the movement direction of said photosensitive member.

10. An apparatus according to claim 9, wherein said deflecting means is disposed optically adjacent said photosensitive member.

11. An apparatus according to claim 9, further comprising developing means for developing latent images formed on said photosensitive member, wherein the scanning position and the exposure position are sequentially disposed in an upstream direction from said developing means, and wherein the optical path of the laser beam deflected by said deflecting means crosses the optical path of the light from the original.

12. An apparatus according to claim 9, wherein said deflecting means includes a fixed mirror for directing the laser beam to said photosensitive member.

13. An apparatus according to claim 12, wherein said exposure means includes a lens for imaging an original on said photosensitive member, and the light rays through the lens are parallel to the laser beam incident on the fixed mirror.

* * * * *

UNITED STATES PATENT AND TRADEMARK OFFICE
CERTIFICATE OF CORRECTION

PATENT NO. : 5,072,260
DATED : December 10, 1991
INVENTOR(S) : Akiyoshi Kimura

It is certified that error appears in the above-identified patent and that said Letters Patent is hereby corrected as shown below:

Column 6, line 19, after "by the", insert --laser beam a portion of said photosensitive member corresponding to a leading edge portion of the transfer material.--

Signed and Sealed this

Twenty-ninth Day of June, 1993

Attest:

MICHAEL K. KIRK

Attesting Officer

Acting Commissioner of Patents and Trademarks